United States Patent [19]

Kanai et al.

[11] Patent Number: 4,535,314

[45] Date of Patent: Aug. 13, 1985

[54] VARISTOR INCLUDES OXIDES OF BISMUTH, COBALT, MANGANESE, ANTIMONY, NICKEL AND TRIVALENT ALUMINUM

[75] Inventors: Hideyuki Kanai, Kawasaki; Takashi Takahashi, Tokyo; Motomasa Imai, Tokyo; Osamu Furukawa, Sagamihara, all of Japan

[73] Assignee: Tokyo Shibaura Denki Kabushiki Kaisha, Kawasaki, Japan

[21] Appl. No.: 563,250

[22] Filed: Dec. 19, 1983

[30] Foreign Application Priority Data

Dec. 24, 1982 [JP] Japan .............................. 57-226208

[51] Int. Cl.[3] ........................ H01C 7/10; C04B 35/00

[52] U.S. Cl. .................................... 338/21; 252/518; 252/521

[58] Field of Search .................................. 338/20–21; 252/518–521

[56] References Cited

U.S. PATENT DOCUMENTS

| | | | |
|---|---|---|---|
| 4,042,535 | 8/1977 | May | 252/518 |
| 4,045,374 | 8/1977 | Nagasawa et al. | 252/518 X |
| 4,046,847 | 9/1977 | Kresge | 252/518 X |
| 4,374,049 | 2/1983 | Ellis et al. | 338/20 X |
| 4,400,683 | 8/1983 | Eda et al. | 338/21 |
| 4,450,426 | 5/1984 | Miyoshi et al. | 338/21 |

FOREIGN PATENT DOCUMENTS

| | | | |
|---|---|---|---|
| 49-119188 | 3/1973 | Japan . | |
| 52-53295 | 4/1977 | Japan . | |
| 56-28362 | 7/1981 | Japan | 252/518 |

*Primary Examiner*—Roy N. Envall, Jr.
*Assistant Examiner*—C. N. Sears
*Attorney, Agent, or Firm*—Oblon, Fisher, Spivak, McClelland & Maier

[57] ABSTRACT

A varistor having good voltage-current nonlinear characteristics and a long life performance. The varistor is formed of a sintered body consisting essentially of zinc oxide as a major component, 0.1 to 5 mol % of bismuth in terms of $Bi_2O_3$, 0.1 to 5 mol % of cobalt in terms of $Co_2O_3$, 0.1 to 5 mol % of manganese in terms of MnO, 0.1 to 5 mol % of antimony in terms of $Sb_2O_3$, 0.1 to 5 mol % of nickel in terms of NiO, and 0.001 to 0.05 mol % of aluminum in terms of $Al^{3+}$.

4 Claims, 2 Drawing Figures

VARISTOR INCLUDES OXIDES OF BISMUTH, COBALT, MANGANESE, ANTIMONY, NICKEL AND TRIVALENT ALUMINUM

BACKGROUND OF THE INVENTION

I. Field of the Invention

The present invention relates to a varistor and a method for manufacturing the same.

II. Description of the Prior Art

Conventionally, a varistor using a sintered body having ZnO as its major component is known. An attempt has been made to incorporate various additives in such a sintered body, thereby obtaining desired characteristics. In general, good voltage-current nonlinear characteristics and a long life performance are required for a varistor. However, a varistor which satisfies the both voltage-current characteristics and life performance has not been obtained. For example, a varistor of a sintered body having ZnO as its major component and $Bi_2O_3$, CoO, $Sb_2O_3$, NiO, and MnO as additives is described in Japanese Patent Disclosure No. 49-119188. However, sufficiently good voltage-current nonlinear characteristics has not been obtained.

It has also been attempted to control $Bi_2O_3$ phase contained in such a sintered body in order to obtain desired characteristics. For example, in Japanese Patent Disclosure No. 50-131094, 10% by weight or more of the total $Bi_2O_3$ content is transformed to the body-centered cubic system ($\gamma$ phase) to increase the stability against a pulse current and a DC load. However, the voltage-current nonlinear characteristics and the life performance greatly depend on the composition of the sintered body. Therefore, the overall characteristics of the varistor cannot be improved by controlling only the $\gamma$-$Bi_2O_3$ phase. In particular, satisfactory voltage-current nonlinear characteristics cannot be obtained.

In the conventional varistors, the both requirements of good voltage-current nonlinear characteristics and a long life performance cannot be simultaneously satisfied. In particular, when a varistor is used as an arrester which must absorb a high surge voltage, good voltage-current nonlinear characteristics must be provided. Furthermore, even stricter criteria are required of such characteristics in the development of ultra high-voltage (UHV) power supply.

SUMMARY OF THE INVENTION

It is, therefore, an object of the present invention to provide a varistor which has good voltage-current nonlinear characteristics and a long life performance.

In order to achieve the above object of the present invention, there is provided a varistor formed of a sintered body consisting essentially of zinc oxide as a major component, 0.1 to 5 mol % of bismuth in terms of $Bi_2O_3$, 0.1 to 5 mol % of cobalt in terms of $Co_2O_3$, 0.1 to 5 mol % of manganese in terms of MnO, 0.1 to 5 mol % of antimony in terms of $Sb_2O_3$, 0.1 to 5 mol % of nickel in terms of NiO, and 0.001 to 0.05 mol % of aluminum in terms of $Al^{3+}$.

The varistor of the present invention has both good voltage-current nonlinearity characteristics and a long life performance.

DETAILED DESCRIPTION OF THE PREFERRED EMBODIMENT

As stated above, the varistor according to the present invention is a sintered body consisting essentially of zinc oxide as a major constituent, 0.1 to 5 mol % of bismuth in terms of $Bi_2O_3$, 0.1 to 5 mol % of cobalt in terms of $Co_2O_3$, 0.1 to 5 mol % of manganese in terms of MnO, 0.1 to 5 mol % of antimony in terms of $Sb_2O_3$, 0.1 to 5 mol % of nickel in terms of NiO, and 0.001 to 0.05 mol % of aluminum in terms of $Al^{3+}$. The $Bi_2O_3$, $Co_2O_3$, MnO, $Sb_2O_3$ and NiO contents must respectively fall within the range from 0.1 and 5 mol % in order to prevent degradation of the nonlinear characteristics and life performance. Similarly, the $Al^{3+}$ content must fall within the range between 0.001 and 0.05 mol % to prevent significant degradation of the nonlinear characteristics and the life performance.

The life performance can be further prolonged by controlling the phase of $Bi_2O_3$. $Bi_2O_3$ can exist in the sintered body as various phases such as $\alpha$ phase (orthorhombic lattice), $\beta$ phase (tetragonal lattice), $\gamma$ phase (body-centered cubic structure), and $\delta$ phase (face-centered cubic structure). Among these phases, the $\beta$ and $\gamma$ phases are important in the sense that a ratio of the $\beta$ phase to the $\gamma$ phase (i.e., $R_\beta$) greatly influences the electrical characteristics of the sintered body. The ratio $R_\beta$ is given by the following equation:

$$R_\beta=[(\text{quantity of } \beta \text{ phase})/\{(\text{quantity of } \beta \text{ phase})+(\text{quantity of } \gamma \text{ phase})\}]\times 100\ (\%)$$

As will be described in detail later, if the ratio $R_\beta$ of the $Bi_2O_3$ phase is decreased, life performance can be improved. However, when the ratio $R_\beta$ becomes less than 20%, the voltage-current characteristics are abruptly degraded. Therefore, the ratio $R_\beta$ preferably exceeds 20%. The ratio $R_\beta$ often most preferably exceeds 90%. This ratio can be controlled by heat-treatment after sintering, to be described later.

Figure 1:
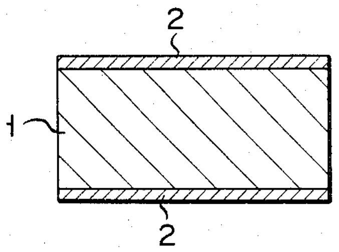
FIG. 1 is a schematic sectional view showing the varistor of the invention along with the electrodes formed thereon.
Figure 2:
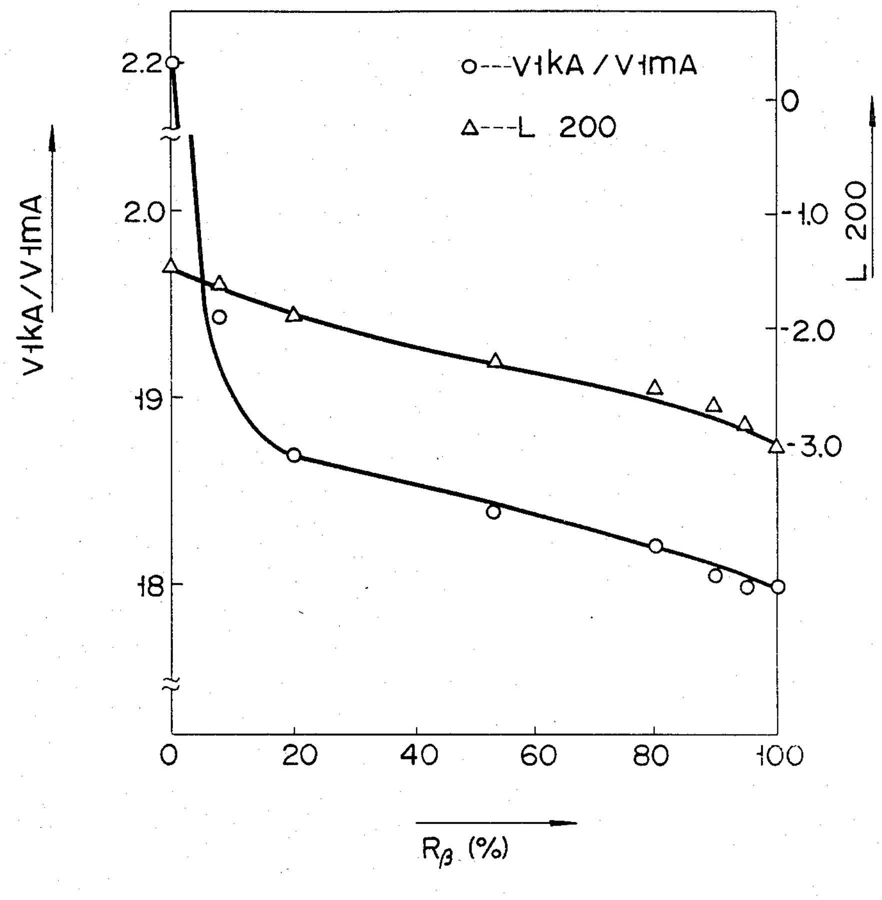
FIG. 2 is a graph for explaining the relationships among $R_\beta$, the voltage-current nonlinear characteristics, and life performance.

The varistor of the present invention can be manufactured in the same manner as the conventional varistor. More particularly, ZnO, 0.1 to 5 mol % of $Bi_2O_3$, 0.1 to 5 mol % of $Co_2O_3$, 0.1 to 5 mol % of MnO, 0.1 to 5 mol % of $Sb_2O_3$, and 0.1 to 5 mol % of NiO are mixed. An aqueous solution of 0.001 to 0.05 mol % of an aluminum salt in terms of $Al^{3+}$ is uniformly added to the resultant mixture. The materials and the aqueous solution is mixed sufficiently and after drying the mixture, pressure molding is carried out. The resultant body is then sintered at a temperature of 1,000° C. to 1,300° C. for about two hours. Thereafter, a pair of electrode 2 is formed on the both abraded surfaces of the sintered body 1 (see FIG. 1). In the above process, the aluminum salt is added as an aqueous solution because the small amount of aluminum must be uniformly dispersed. In this case, any water-soluble aluminum salt can be used. In general, aluminum nitrate is used as the water-soluble aluminum salt. The metal oxide is used in the above process. However, alternatively, any metal compound which can be converted to an oxide after sintering can be used. Therefore, carbonate, for example, can be used in place of the metal oxide.

The ratio $R_\beta$ of the phase of $Bi_2O_3$ in the above-mentioned sintered body is 100%. If a further improvement of the life performance is required, the resultant sintered body is heat-treated at a temperature of, preferably, 400° C. to 700° C. In this case, the ratio $R_\beta$ is greatly decreased when the sintered body is heat-treated at a high temperature. However, the ratio $R_\beta$ is not greatly decreased when the sintered body is treated at a low temperature. The ratio $R_\beta$ is also influenced by the composition of the sintered body. Therefore, heat-treating conditions of the sintered body having a predetermined composition may be properly determined in accordance with a desired ratio $R_\beta$.

The varistor of the present invention can absorb a surge in the same manner as the conventional varistor. Furthermore, the varistor of the present invention has advantages in voltage-current nonlinearity characteristics and life performance, and it can be suitably used as an arrester or the like which must absorb a large surge.

EXAMPLES 1-18 AND COMPARATIVE EXAMPLES 1-17

ZnO, $Bi_2O_3$, $Co_2O_3$, MnO, $Sb_2O_3$, NiO and $Al(NO_3)_3\ 9H_2O$ were mixed in a composition ratio shown in Table 1, and PVA was added as a binder thereto in accordance with a conventional method. The mixture was granulated and a disc was then formed and dried. The resultant body was sintered at a temperature of 1,100° C. to 1,300° C. for about 2 hours. Both major surfaces were polished to form a sintered body having a diameter of 20 mm and a thickness of 2 mm.

Aluminum electrodes were formed by flame spray coating on both surfaces of the sintered body, and the voltage-current nonlinear characteristics and the life performance were examined. The voltage-current nonlinear characteristics are given as $V_{1kA}/V_{1mA}$ as follows:

$$V_{1kA}/V_{1mA} = V \text{ (voltage when a current of 1 kA flows)}/V \text{ (voltage when a current of 1 mA flows)}$$

when the ratio $V_{1kA}/V_{1mA}$ is decreased, the voltage-current nonlinear characteristics are improved. On the other hand, the life performance is given as $L_{200}$ as follows:

$$L_{200} = [\{V \text{ (after 200 hours)} - V \text{ (beginning)}\}/V \text{ (beginning)}] \times 100$$

wherein the voltage V (after 200 hours) is measured at room temperature after 95% of $V_{1mA}$ has been continuously applied for 200 hours at temperature of 150° C. The voltages in the above formula indicate sinusoidal peak voltages of 50 Hz when a current of 1 mA flows. When $|L_{200}|$ is decreased, the life performance is prolonged. The measurement results are shown in Table 1. In Table 1, Comparative Examples 1 to 17 show the results when a given component of the sintered body does not fall within the range of the present invention.

TABLE 1

| Example | $Bi_2O_3$ (mol %) | $Co_2O_3$ (mol %) | MnO (mol %) | $Sb_2O_3$ (mol %) | NiO (mol %) | $Al^{3+}$ (mol %) | $V_{1kA}/V_{1mA}$ | $L_{200}$ (−) |
|---|---|---|---|---|---|---|---|---|
| 1 | 0.1 | 0.5 | 1.0 | 1.0 | 1.0 | 0.01 | 1.82 | 3.5 |
| 2 | 3.0 | 0.5 | 1.0 | 1.0 | 1.0 | 0.01 | 1.80 | 3.2 |
| 3 | 5.0 | 0.5 | 1.0 | 1.0 | 1.0 | 0.01 | 1.81 | 3.4 |
| 4 | 0.5 | 0.1 | 1.0 | 1.0 | 1.0 | 0.01 | 1.81 | 3.3 |
| 5 | 0.5 | 3.0 | 1.0 | 1.0 | 1.0 | 0.01 | 1.80 | 3.1 |
| 6 | 0.5 | 5.0 | 1.0 | 1.0 | 1.0 | 0.01 | 1.81 | 3.4 |
| 7 | 0.5 | 0.5 | 0.1 | 1.0 | 1.0 | 0.01 | 1.82 | 3.3 |
| 8 | 0.5 | 0.5 | 3.0 | 1.0 | 1.0 | 0.01 | 1.80 | 3.1 |
| 9 | 0.5 | 0.5 | 5.0 | 1.0 | 1.0 | 0.01 | 1.82 | 3.2 |
| 10 | 0.5 | 0.5 | 0.5 | 0.1 | 1.0 | 0.01 | 1.81 | 3.2 |
| 11 | 0.5 | 0.5 | 0.5 | 3.0 | 1.0 | 0.01 | 1.80 | 3.1 |
| 12 | 0.5 | 0.5 | 0.5 | 5.0 | 1.0 | 0.01 | 1.81 | 3.3 |
| 13 | 0.5 | 0.5 | 0.5 | 1.0 | 0.1 | 0.01 | 1.81 | 3.2 |
| 14 | 0.5 | 0.5 | 0.5 | 1.0 | 3.0 | 0.01 | 1.80 | 3.1 |
| 15 | 0.5 | 0.5 | 0.5 | 1.0 | 5.0 | 0.01 | 1.81 | 3.3 |
| 16 | 0.5 | 0.5 | 0.5 | 1.0 | 1.0 | 0.001 | 1.80 | 3.3 |
| 17 | 0.5 | 0.5 | 0.5 | 1.0 | 1.0 | 0.03 | 1.80 | 3.1 |
| 18 | 0.5 | 0.5 | 0.5 | 1.0 | 1.0 | 0.05 | 1.80 | 3.2 |

| Comparative Example | $Bi_2O_3$ (mol %) | $Co_2O_3$ (mol %) | MnO (mol %) | $Sb_2O_3$ (mol %) | NiO (mol %) | $Al^{3+}$ (mol %) | $V_{1kA}/V_{1mA}$ | $L_{200}$ (−) |
|---|---|---|---|---|---|---|---|---|
| 1 | 0.05 | 0.5 | 0.5 | 1.0 | 1.0 | 0.01 | 2.10 | 12.5 |
| 2 | 7.0 | 0.5 | 0.5 | 1.0 | 1.0 | 0.01 | 1.98 | 10.8 |
| 3 | 0.5 | 0.05 | 0.5 | 1.0 | 1.0 | 0.01 | 1.96 | 11.3 |
| 4 | 0.5 | 7.0 | 0.5 | 1.0 | 1.0 | 0.01 | 2.01 | 10.9 |
| 5 | 0.5 | 0.5 | 0.05 | 1.0 | 1.0 | 0.01 | 2.01 | 11.1 |
| 6 | 0.5 | 0.5 | 7.0 | 1.0 | 1.0 | 0.01 | 2.02 | 10.8 |
| 7 | 0.5 | 0.5 | 0.5 | 0.05 | 1.0 | 0.01 | 2.08 | 10.6 |
| 8 | 0.5 | 0.5 | 0.5 | 7.0 | 1.0 | 0.01 | 1.99 | 10.7 |
| 9 | 0.5 | 0.5 | 0.5 | 1.0 | 0.05 | 0.01 | 2.05 | 10.9 |
| 10 | 0.5 | 0.5 | 0.5 | 1.0 | 7.0 | 0.01 | 2.03 | 11.2 |
| 11 | 0.5 | 0.5 | 0.5 | 1.0 | 1.0 | 0.0005 | 1.96 | 10.7 |
| 12 | 0.5 | 0.5 | 0.5 | 1.0 | 1.0 | 0.07 | 1.98 | 10.5 |
| 13 | 0.5 | 0.5 | 0.5 | 0.5 | 0.5 | — | 2.02 | 13.2 |
| 14 | 1.5 | 0.5 | 0.5 | 1.0 | 0.5 | — | 2.03 | 13.1 |
| 15 | 0.5 | 0.5 | 1.5 | 1.0 | 1.0 | — | 2.00 | 13.5 |
| 16 | 0.5 | 1.0 | 1.0 | 0.5 | 1.0 | — | 2.05 | 13.4 |

-continued

| Comparative Example | $Bi_2O_3$ (mol %) | $Co_2O_3$ (mol %) | MnO (mol %) | $Sb_2O_3$ (mol %) | NiO (mol %) | $Al^{3+}$ (mol %) | $V_{1kA}/V_{1mA}$ | $L_{200}$ (−) |
|---|---|---|---|---|---|---|---|---|
| 17 | 0.5 | 1.0 | 1.0 | 0.5 | 1.0 | — | 2.06 | 13.3 |

The sintered bodies of Examples 1 to 18 have a higher voltage-current nonlinear characteristics and a longer life performance $L_{200}$, as compared with those of Comparative Examples 1 to 17. In particular, the sintered bodies of Comparative Examples 13 to 17 which contain no $Al^{3+}$ have poor voltage-current nonlinear characteristics and a short life performance.

EXAMPLE 19

A sintered body was prepared in the same manner as in the above examples and had a composition as follows:

| | | | |
|---|---|---|---|
| $Bi_2O_3$ | 0.5 mol % | $Co_2O_3$ | 0.5 mol % |
| MnO | 0.5 mol % | $Sb_2O_3$ | 1.0 mol % |
| NiO | 1.0 mol % | $Al^{3+}$ | 0.01 mol % |
| ZnO | balance | | |

The resultant sintered body was heat-treated at a temperature of 400° C. to 700° C., so that varistors having various $R_\beta$ values were obtained. The relationships among the ratio $R_\beta$, the ratio $V_{1kA}/V_{1mA}$ and the $L_{200}$ were examined. The results are illustrated in the accompanying drawing. The ratio $R_\beta$ was measured from X-ray diffraction and was given as follows:

$$R_\beta = [(\beta\text{-}Bi_2O_3 \text{ maximum intensity})/\{(\beta\text{-}Bi_2O_3 \text{ maximum intensity}) + (\gamma\text{-}Bi_2O_3 \text{ maximum intensity})\}] \times 100$$

As is apparent from the accompanying drawing, when the ratio $R_\beta$ is kept small, the life performance can be improved. However, as the ratio $R_\beta$ is decreased, the voltage-current nonlinear characteristics are degraded, particularly at the ratio $R_\beta$ of less than 20%. Therefore, the ratio $R_\beta$ preferably falls within the range of 20% to 100%. When the varistor is used as an arrester, it must absorb a surge voltage. In this case, the ratio $R_\beta$ is preferably set within the range between 90% and 100%.

When the relationships among $R_\beta$, $V_{1kA}/V_{1mA}$ and $L_{200}$ were examined for a sintered body having other compositions, the similar result as in Example 19 were obtained.

What is claimed is:

1. A varistor formed of a sintered body consisting essentially of:

zinc oxide as a major component;
0.1 to 5 mol % of bismuth in terms of $Bi_2O_3$;
0.1 to 5 mol % of cobalt in terms of $Co_2O_3$;
0.1 to 5 mol % of manganese in terms of MnO;
0.1 to 5 mol % of antimony in terms of $Sb_2O_3$;
0.1 to 5 mol % of nickel in terms of NiO; and
0.001 to 0.05 mol % of aluminum in terms of $Al^{3+}$.

2. The varistor according to claim 1, wherein said sintered body contains a $Bi_2O_3$ phase in a ratio $R_\beta$ exceeding 20%, where $R_\beta = [(\text{quantity of } \beta \text{ phase})/\{(\text{quantity of } \beta \text{ phase}) + (\text{quantity of } \gamma \text{ phase})\}] \times 100\%$.

3. A varistor formed of a sintered body consisting essentially of:

zinc oxide as a major component;
0.1 to 5 mol % of bismuth in terms of $Bi_2O_3$;
0.1 to 5 mol % of cobalt in terms of $Co_2O_3$;
0.1 to 5 mol % of manganese in terms of MnO;
0.1 to 5 mol % of antimony in terms of $Sb_2O_3$;
0.1 to 5 mol % of nickel in terms of NiO; and
0.001 to 0.05 mol % of aluminum in terms of $Al^{3+}$ wherein said sintered body contains a $Bi_2O_3$ phase in a ratio $R_\beta$ exceeding 90%,
wherein $R_\beta = [(\text{quantity of } \beta \text{ phase})/\{(\text{quantity of } \beta \text{ phase}) + (\text{quantity of } \gamma \text{ phase})\}] \times 100\%$.

4. A varistor formed of a sintered body consisting of:

zinc oxide as a major component;
0.1 to 5 mol % of bismuth in terms of $Bi_2O_3$;
0.1 to 5 mol % of cobalt in terms of $Co_2O_3$;
0.1 to 5 mol % of manganese in terms of MnO;
0.1 to 5 mol % of antimony in terms of $Sb_2O_3$;
0.1 to 5 mol % of nickel in terms of NiO; and
0.001 to 0.05 mol % of aluminum in terms of $Al^{3+}$

* * * * *